United States Patent [19]
Howard et al.

[11] Patent Number: 5,887,442
[45] Date of Patent: Mar. 30, 1999

[54] REFRIGERATION CONDENSER FILTER SYSTEM

[76] Inventors: Jeffery T. Howard; R. Rochelle Howard, both of 5670 Fosters Mill Rd. SW., Cave Spring, Ga. 30124

[21] Appl. No.: 868,795

[22] Filed: Jun. 4, 1997

[51] Int. Cl.⁶ .................................................. F25B 49/02
[52] U.S. Cl. ............................ 62/129; 62/507; 340/607
[58] Field of Search ............................ 62/506, 507, 508, 62/428, 429, 262, 303, 317, 126, 127, 129; 165/119; 55/490, 491, 492, 493, 495, 512, 513, 514; 340/607

[56] References Cited

U.S. PATENT DOCUMENTS

| | | | |
|---|---|---|---|
| 2,789,175 | 4/1957 | Mahr | 340/607 X |
| 3,348,365 | 10/1967 | Dupre | 62/262 X |
| 5,050,398 | 9/1991 | Lane et al. | 62/183 |
| 5,097,678 | 3/1992 | Aubuchon | 62/506 |
| 5,129,239 | 7/1992 | Thurman | 62/507 |
| 5,131,463 | 7/1992 | Zimmerli et al. | 165/119 |
| 5,156,662 | 10/1992 | Downing et al. | 55/493 X |
| 5,351,035 | 9/1994 | Chrisco | 340/607 |
| 5,689,969 | 11/1997 | Conroy | 62/262 |

Primary Examiner—Harry B. Tanner
Attorney, Agent, or Firm—Nikolai, Mersereau & Dietz, P.A.

[57] ABSTRACT

A refrigeration system for an ice-making machine is provided with an inlet filter system having a replaceable filter element to trap dirt, dust and other airborne contaminants which would otherwise accumulate on heat transfer surfaces. The system is further provided with a device to indicate that the filter element should be changed.

8 Claims, 6 Drawing Sheets

REFRIGERATION CONDENSER FILTER SYSTEM

BACKGROUND OF THE INVENTION

I. Field of the Invention

The present invention is directed generally to refrigeration systems, particularly to those of the vapor compression variety exemplified by so-called "split" systems which are well known and includes separate compartments for cooling and heat dissipation. The cooling or refrigeration compartment is a closed system that includes an evaporator which absorbs heat from and cools the surrounding air and the heat dissipating compartment is open and houses a compressor, together with an air cooled condenser unit, typically a fin and tube heat exchange device. More specifically, the present invention deals with the provision of a protective air filter arrangement for the condenser unit associated with the compressor that prevents dirt buildup on heat transfer surfaces without unduly restricting cooling air flow.

II. Related Art

High duty refrigeration systems such as those utilized in conjunction with packaged ice merchandizing or vending storage chests, or indoor ice making and dispensing machines such as those found in hotels, require the dissipation of relatively large amounts of heat at the condenser during operation. This requires large amounts of cooling air to be utilized to cool the condenser to maintain the temperature of the condenser at or less than the desired maximum operating temperature. The well-known coil and high surface fin heat transfer heat exchange devices used for such systems may be open and totally unprotected, but more often are enclosed in a metal box structure provided with a series of louvered slots or openings through which air is admitted and discharged. Air flow is maintained by a shroud enclosed cooling fan which pulls ambient air in through the louvers and over the closely spaced fins and discharges it from the opposite side of the structure. While this generally assures an adequate supply of cooling air for the condenser, dust and other foreign airborne materials and debris in the ambient air are also sucked through the system. These tend to accumulate on the heat transfer surfaces of the system and are difficult to clean particularly in view of the close parallel spacing of the fin surfaces. In some instances, complete clogging between some of the fins may occur. Contaminates on the cooling surfaces, of course, tend to reduce heat transfer efficiency and may result in the condenser operating at a higher than ideal temperature thereby reducing overall system efficiency. This also, of course, requires the compressor to operate less efficiently and for more of the time than designed each cycle and may lead to premature compressor failure.

The problem is particularly severe with regard to self-contained ice making machines and packaged ice storage chests such as those located inside convenience stores, or the like, where the condenser is exposed to a dusty environment. Dust, lint and other airborne debris are known to accumulate indoors and this problem has worsened more recently because energy efficiency concerns with regard to heating and cooling have led people to reduce air leakage and ventilation. Also, because of factors such as theft and vandalism, many units, formerly outdoors have simply been moved indoors to avoid crime problems. In some instances, where clogging or dust buildup may not have been much of a concern outdoors, problems occurred when the system was moved inside. Units located outside buildings are more susceptible to buildup of dust where unpaved parking or other dust sources are nearby. Presently, nothing is provided to prevent or reduce natural buildup and contamination of the cooling surfaces from dust and airborne debris.

In most applications, the heat transfer fins are hard to access for cleaning and difficult to clean without special tools and sources of high pressure air or water to blast accumulated debris from the surfaces. On the other hand, failure to clean the system on a regular basis may lead to higher inefficiency and shorter compressor life as indicated above.

Accordingly, it is a primary object of the present invention to provide a low cost inlet filter system to reduce contamination of the heat transfer surfaces of a refrigerant condenser system utilizing ambient cooling air.

Another object of the present invention is to provide a low cost cooling air inlet filter for a condenser unit that uses a replaceable filter element.

Yet another object of the present invention is to provide an inlet filter system that minimizes associated flow restriction and refrigerant temperature rise in the condenser unit.

Yet still another object of the present invention is to provide a cooling air filter system that includes a replaceable filter element and signaling device to indicate that the element needs changing.

Other objects and advantages of the present invention will occur to those skilled in the art upon further familiarization with the specification, drawings and claims contained herein.

SUMMARY OF THE INVENTION

By means of the present invention, problems associated with the accumulation of dust, dirt and other airborne foreign material carried by cooling air and which accumulate on heat transfer surfaces of refrigeration condenser fins and tubes (coils) are curtailed or eliminated by the provision of an inlet filtering system on the upstream side of the condenser unit so that the cooling air circulated by the condenser cooling fan is pulled through the filter element prior to reaching the heat transfer surfaces. The filter is configured to match the size and shape of the cooling coil or condenser unit and includes a mounting frame and a replaceable filter element.

In accordance with one embodiment of the invention, light gauge metal, normally aluminum, frame is utilized to support a thickness of a filter material, which may be a mat of spun polyester filter material and which is preferably formed as a replaceable element to be fit into the metal frame. The metal frame may contain a screen to maintain the filter element in position. The size and dimensions of the metal frame and so the filter element may be changed to accommodate any size compressor cooling coil system. The thickness and weave or mat of the spun polyester or other filter material is one which enables the trapping of most airborne particulate material but which, at the same time, does not substantially restrict cooling air flow. Filter elements in accordance with the present invention trap and prevent deposition of substantially all of the dust and other particulate materials which normally accumulate on the heat transfer surfaces without restricting airflow to the point where temperature rise in the condenser exceeds a safe amount. The temperature and pressures of the system remain in the normal range. Periodic replacement of the filter element will maintain the system in good order.

In accordance with the invention, it is also contemplated that a warning device or visible display be provided to indicate the need to change the filter element to promote timely replacement by the operator of the system. A current-sensitive electrical relay-controlled indicator light may be provided in the compressor circuit that is energized in response to an increase in motor current beyond a preset value. This takes place when the filter clogs sufficiently to appreciably impair condenser cooling airflow.

BRIEF DESCRIPTION OF THE DRAWINGS

In the drawings, wherein like numerals designate like parts throughout the same.

DETAILED DESCRIPTION

While the detailed embodiment refers to refrigeration equipment involved in ice making and storage, it will be appreciated that this is not meant to limit the application of the invention in any manner. Such units also have long been associated with chests for merchandizing packaged ice and many other uses where the associated condenser is exposed to airborne contaminants.

Figure 1:
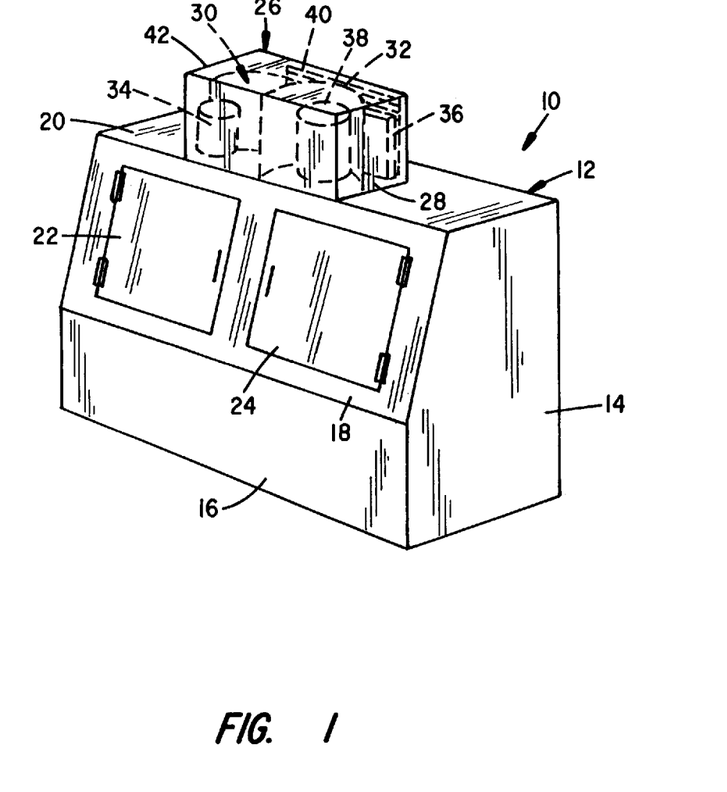
FIG. 1 is a perspective schematic view depicting a typical ice freezing and storage unit of a type typically used for merchandizing ice to consumers with the compressor and condenser system as shown in phantom atop the unit as presented in the prior art, i.e. without the filter system of the invention.

FIG. 1 depicts a self-contained ice making machine shown generally at 10 of the type utilized to produce ice for storage and vending otherwise supplying ice to the public and typically located at convenience stores, filling stations or other such locations. Similar refrigeration systems are also commonly used in conjunction with the storage and vending of pre-packaged ice. The refrigeration apparatus is enclosed in a cabinet 26 located above an ice storage chest 12 which includes a pair of end walls as at 14. A vertical lower front panel 16 and angled upper front panel 18 are shown together with a top panel 20. Opposed doors 22 and 24 provide access to the internal ice storage section of the apparatus in a well-known manner.

The refrigeration system associated with the ice making storage apparatus is contained in the rectangular enclosure 26 mounted on top of the cabinet 12 and divided into a cooling or ice making compartment 28 and a heat dissipating section 30, the two sections being separated by a partition wall, shown in phantom at 32. Also shown in phantom in the enclosure 26 are a compressor represented by 34 and an associated condenser heat exchanger shown at 36. An ice forming module is shown at 38 and cooling air inlet louver slots are indicated by the dashed lines at 40 in the rear of the box-like structure 26. Discharge louvers which are normally located in the end walls of the structure 26 connected with the compartment 30 are not illustrated.

Figure 2:
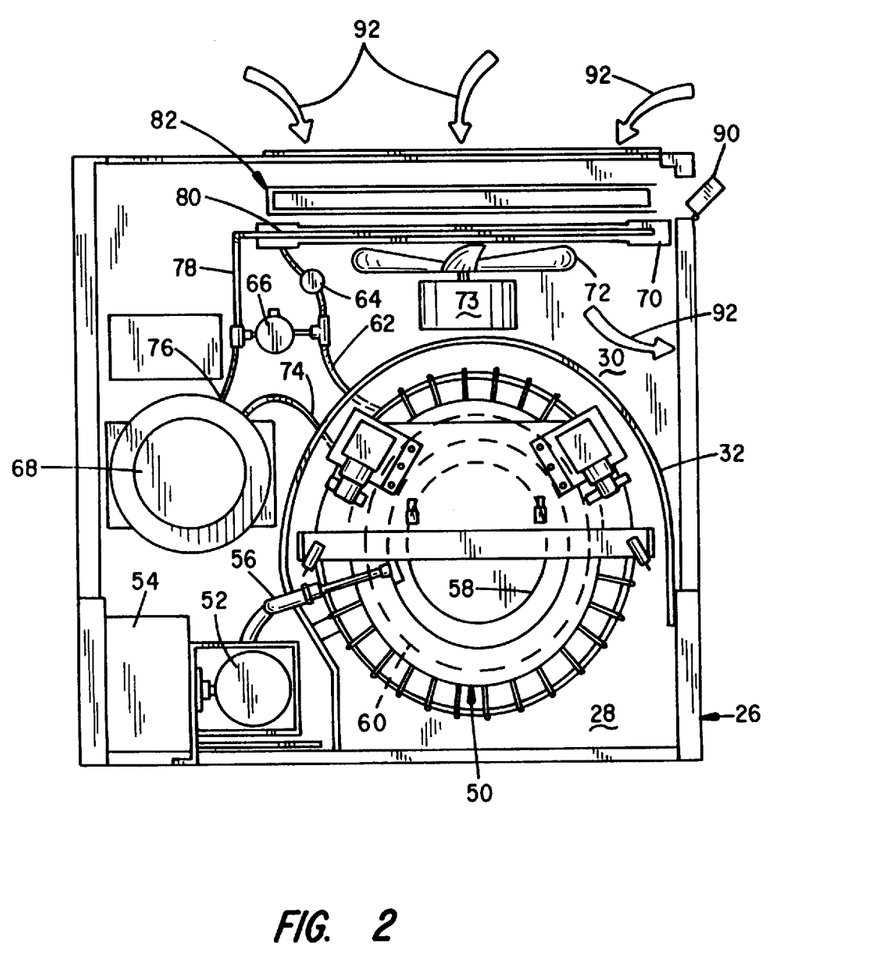
FIG. 2 depicts a top view of an ice making machine including a heat dissipating compartment with a compressor and condensing system utilizing a filter in accordance with the invention.

An enlarged top view of an ice making apparatus such as that shown in FIG. 1 with the top removed to expose the internal parts is illustrated in FIG. 2. As in FIG. 1, the structure 26 is divided into internal compartments 28 and 30 separated by the partition wall at 32. The various details and construction of a particular ice-making machine, or other refrigeration machine of the class is believed well understood and of itself forms no part of the present invention. Thus, generally, the cooling or refrigerating section 28 includes an ice molding device 50 which is supplied from outside the compartment 28 using a water pump 52 pumping water from a source 54 which will be permanently plumbed through an inlet line 56 which, in turn, supplies a mold filling spray bar 58 which fills the ice molding means once each freezing cycle so that a filled mold produces ice on a batchwise basis, the ice being dislodged into the storage compartment after each freezing cycle in a well-known fashion. Dislodged ice falls into the main bin of the holding chest 12.

Figure 3:
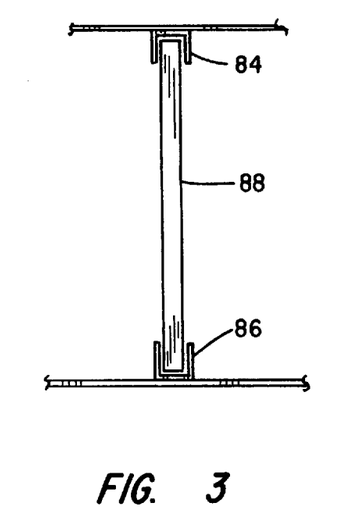
FIG. 3 depicts one possible mounting of a filter element of FIG. 2 in accordance with the invention.

The evaporator of the refrigeration system is indicated by the phantom line at 60 and liquid refrigerant is supplied to the evaporator through a line 62 and a refrigerant expansion control shown at 64. A bypass device is shown at 66 which is normally closed, but may be opened during the dislodgement or harvesting segment of the ice generating cycle to temporarily interrupt the cooling input to the system. The heat absorbed at the evaporator system 60 is dissipated by devices in the chamber portion designated 30 which include a compressor 68 which operates in conjunction with condenser module 70 which is air cooled utilizing cooling fan 72, thus, refrigerant vapor from the evaporator 60 supplied to the compressor inlet via line 74. The discharge port 76 of the compressor 68 is connected to a discharge line 78 connected to the serpentine condenser coil at 80 which returns liquefied, cooled refrigerant to line 62. The system further contains a cooling air inlet filter system generally at 82 and also pictured better with regard to FIG. 3. The filter system may include upper and lower filter element containment brackets 84 and 86 into which a filter element frame 88 is slide fit utilizing a side access door shown open at 90 in FIG. 2. Air flow into the system in indicated by arrows 92 and, as can be seen from the drawings, the filter is constructed so as to entirely cover the exposed portion of the condenser module 70.

Figure 6A:
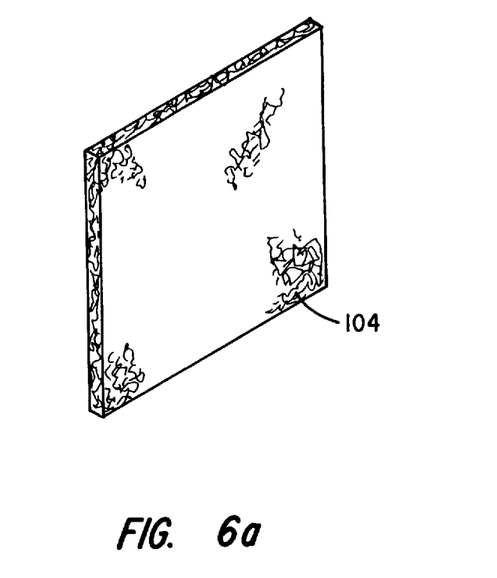
FIGS. 6a and 6b show a typical filter element and frame, respectively, in accordance with an embodiment of the invention.
Figure 6B:
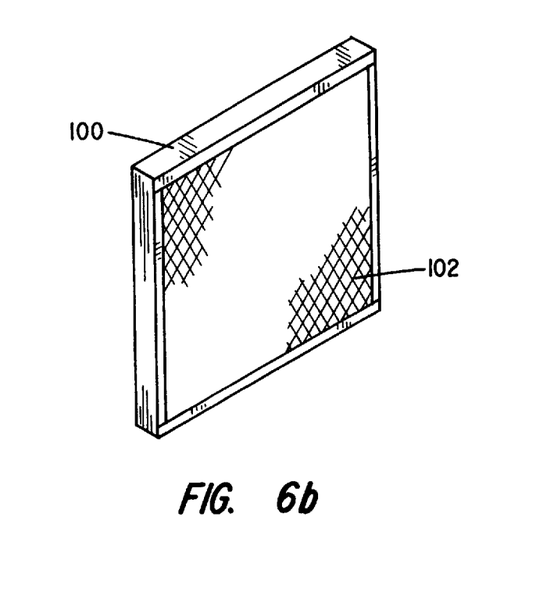

Representative filter element parts are shown in FIGS. 6a and 6b. FIG. 6b depicts a metal frame 100 which may be of relatively thin gauge metal such as 24 gauge aluminum stock and which contains a screen as at 102 fixed to one side of the frame. The dimensions of the steel frame 100 may vary, both respect to length and width and thickness depending on the filter element to be employed. Generally, the thickness is from about ½ inch (1.27 cm) to about 1 inch (2.54 cm). The filter medium itself is shown in FIG. 3a and is typically a woven polyester material of rather low density which has been treated with an anti-microbial material. The surface of the filter media or filter element 104 may be treated or coated to make it somewhat tacky and thereby exhibit superior particulate attraction properties. A woven spun polyester material has been used successfully in such filters, however, it is further contemplated that any material which has sufficient filter properties but yet which, when used as a filter element, has sufficiently low flow impedance could be used.

An important aspect of the filter system of the invention is that the overall cooling effect of the cooling air on the heat exchanger of the condenser is minimally impeded by the device and so allows the system to operate at the designed temperatures. It should be kept in mind that one important application of the invention is to utilize such devices as retrofits on existing systems which, of course, were designed and constructed with unrestricted cooling air flow in mind when the design heat transfer calculations were made.

Figure 4A:
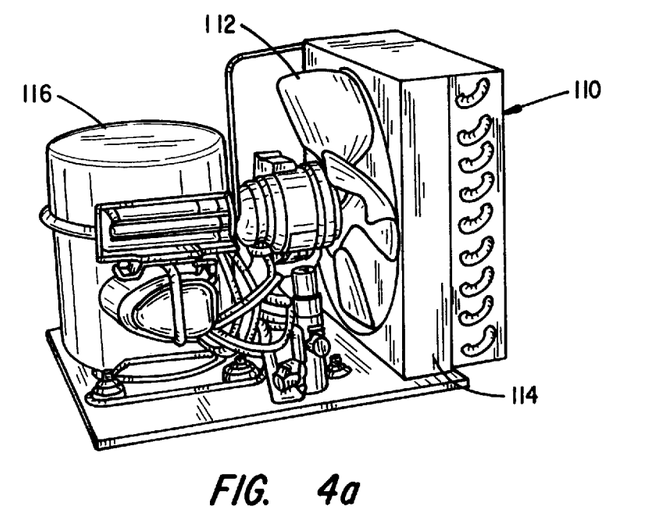
FIGS. 4a and 4b illustrate open-type condenser units associated with ice making refrigeration systems which are readily clogged.
Figure 4B:
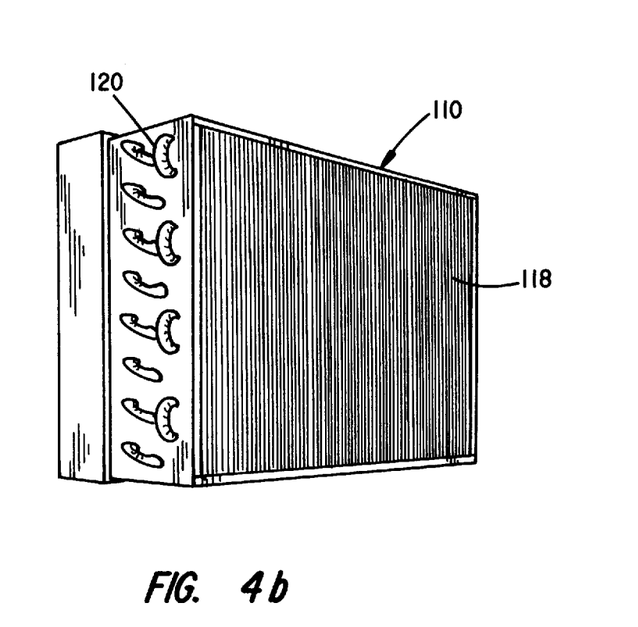

FIGS. 4a and 4b show typical heat dissipating fragments of open-type refrigeration systems of a class easily retrofitted with a filter in accordance with the invention illustrating, as in 4a, and a condenser 110 with cooling fan 112 shrouded by shroud 114. A compressor 116 is also depicted. FIG. 4b depicts the front face perspective of the condenser shown in FIG. 4a in which the front face of the fins is depicted at 118. Debris, dust and other material readily collect on the surfaces of the fins and may even clog the area between the fins completely to decrease the flow across the fins and the coil or tubes 120 containing the refrigerant to be cooled. In this manner, the refrigerant in the coil 120 is returned to the system at a temperature higher than desired thereby reducing the cooling effect of the refrigerant which, in turn, increases the on-time part of the compressor cycle. Buildup of contaminates which prevent proper heat transfer normally eventually result in failure of the compressor due to its being required to operate during much more of the freezing cycle than was designed.

Figure 5:
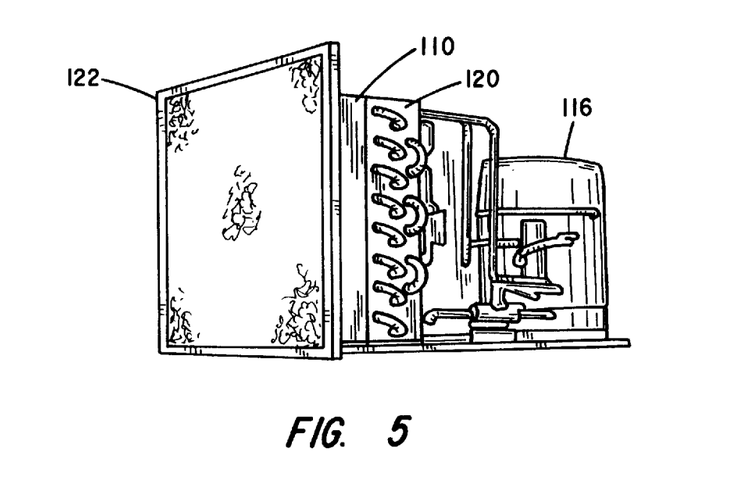
FIG. 5 illustrates the placement of a filter element in accordance with the invention on the cooling air intake side of the heat dissipating system of FIGS. 4a and 4b.

FIG. 5 depicts a system as in FIGS. 4a and 4b in which a filter module 122 has been placed in front of the condenser 110 to simulate a filter retrofitted to the cooling air upstream of the condenser in accordance with the invention. Utilizing the filter in this configuration has been shown to improve the performance of the refrigeration system and maintain the integrity of the heat transfer surfaces of the fins, tubes or coils. Temperature measurements made on such units show that the condensers continue to operate within tolerable temperature limits with the filters in place and cleaned heat exchangers remain uncontaminated. The units such as filter 130 are readily replaced in their entirety as they may also be made of paper or fiberboard utilizing thin metal retaining screen. It can be of similar construction to replaceable furnace filters, replaced in home ductwork upstream of the furnace fan. Of course, elements such as 104 can be replaced while retaining the frame 100 in tact for use with a plurality of replaced elements 104.

Figure 7:
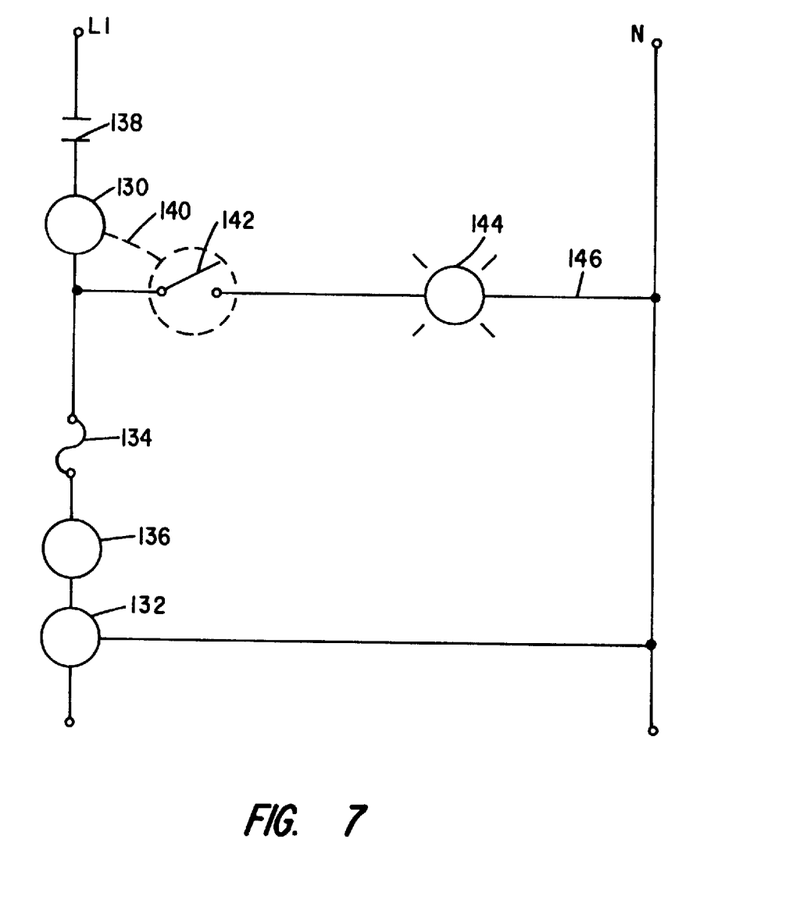
FIG. 7 depicts a schematic diagram of a system for indicating the need to change the filter element in accordance with the invention.

In conjunction with the air filtering concept of the invention, a filter change warning or indicating system may be provided to promote timely filter replacement by the vendor or other system operator. FIG. 7 is a schematic diagram of an electrically operated indicator system for notifying the ice vendor or other system operator of the need to change the filter. The system is sensitive to the current drawn by the compressor motor which is known to increase when system efficiency decreases as when the airflow across the condenser heat exchanger decreases and the temperature rises. The system illustrated includes a current sensitive relay 130 in series with compressor motor 132. The motor circuit is conventional and includes an overload protection disconnect device, such as a fused disconnect, as shown at 134 with timer 136 along with motor starter or relay contacts 138. The relay 130 is connected by a control link shown in the dashed line at 140 to a normally open (NO) switch or relay 142 connected in series with a filter element change indicator light shown at 144 which may be located in a prominent position on the outside of the unit.

In operation, when the refrigeration system is operating normally and the current drawn by the compressor motor is less than a preset limit, the system is as illustrated with the "NO" switch 142 in the open position. When the current drawn by the motor 132 exceeds the preset limit indicating an overload condition in the condensing system, the current sensitive relay 130 sends a signal that causes the "NO" light switch or relay 142 in line 146 to close and turn on the light 144 indicating that the filter element should be changed.

The signaling system thus promotes efficient use of the filtering concept by notifying the operator that unnecessary power is being consumed due to a dust laden filter element. In addition to or instead of a prominent local system indicator light, a remote indicator may also be used and connected in any well known fashion. An audible signal may also be incorporated as a part of the signaling system if desired. Such devices are conventional and may be connected to the relay 130 and/or in series with the line 146.

This invention has been described herein in considerable detail in order to comply with the Patent Statutes and to provide those skilled in the art with the information needed to apply the novel principles and to construct and use such specialized components as are required. However, it is to be understood that the 30 invention could be carried out by specifically different equipment and devices, and that various modifications, both as to the equipment details and operating procedures, can be accomplished without departing from the scope of the invention itself.

What is claimed is:

1. A filter system for a refrigeration system, said refrigeration system having a compressor and a compressor motor for driving the compressor, a fin and tube condenser heat exchanger, and a cooling fan for moving air across said heat exchanger, said filter system further comprising:
   (a) a filter unit mounted just upstream of said condenser heat exchanger and disposed between said heat exchanger and a source of said cooling air such that said cooling air is caused to flow through said filter before encountering the heat exchanger;
   (b) said filter unit further comprising a frame and a filter element;
   (c) a warning device for indicating that said filter element should be replaced; and
   (d) wherein said warning device further comprises a current sensitive relay connected in a circuit with said compressor motor, wherein said relay controls operation of said warning device in response to an increase in current drawn by said compressor motor.

2. The apparatus of claim 1 wherein said relay includes a set of normally open contacts set to close at a predetermined amperage level in said compressor motor.

3. The apparatus of claim 2 wherein said warning systems includes an indicating light connected in series with said set of normally open contacts.

4. The apparatus of claim 1 wherein said refrigeration system is connected to an ice storage chest.

5. The apparatus of claim 4 wherein said warning device includes an indicating light.

6. The apparatus of claim 1 wherein said filter unit is large enough to cover the fin area of said condenser heat exchanger.

7. The apparatus of claim 1 wherein said warning device includes an indicating light.

8. A method of preventing electrical overload in a compressor motor of a refrigeration system having a compressor and a compressor motor for driving the compressor, a fin and tube condenser heat exchanger and a cooling fan for moving air across said heat exchanger, a filter unit including a replaceable filter element disposed to filter cooling air before it encounters said heat exchanger, the method comprising the steps of:

(a) providing a warning system including a current sensitive relay in a circuit with said compressor motor, wherein said relay operates a dirty filter warning device in response to an increase in current drawn by said compressor motor; and (b) replacing the filter element in response to an activation of said warning device.

* * * * *